G. W. BELL.
DEVICE FOR SHAPING THE OUTER CASINGS OF PNEUMATIC TIRES.
APPLICATION FILED JULY 25, 1912.

1,061,722.

Patented May 13, 1913.
4 SHEETS—SHEET 1.

WITNESSES.

INVENTOR.
George Wilson Bell

G. W. BELL.
DEVICE FOR SHAPING THE OUTER CASINGS OF PNEUMATIC TIRES.
APPLICATION FILED JULY 25, 1912.
1,061,722.
Patented May 13, 1913.
4 SHEETS—SHEET 2.
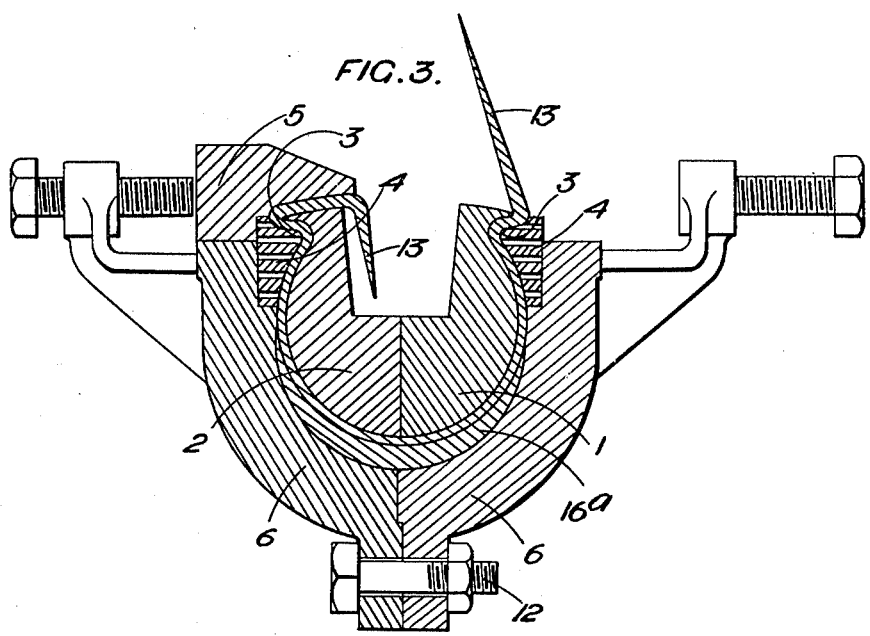
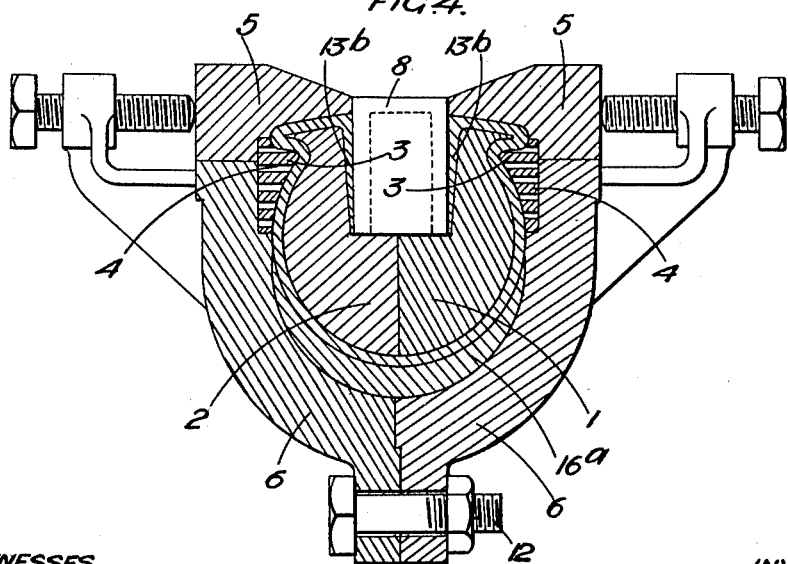
WITNESSES
INVENTOR.
George Wilson Bell

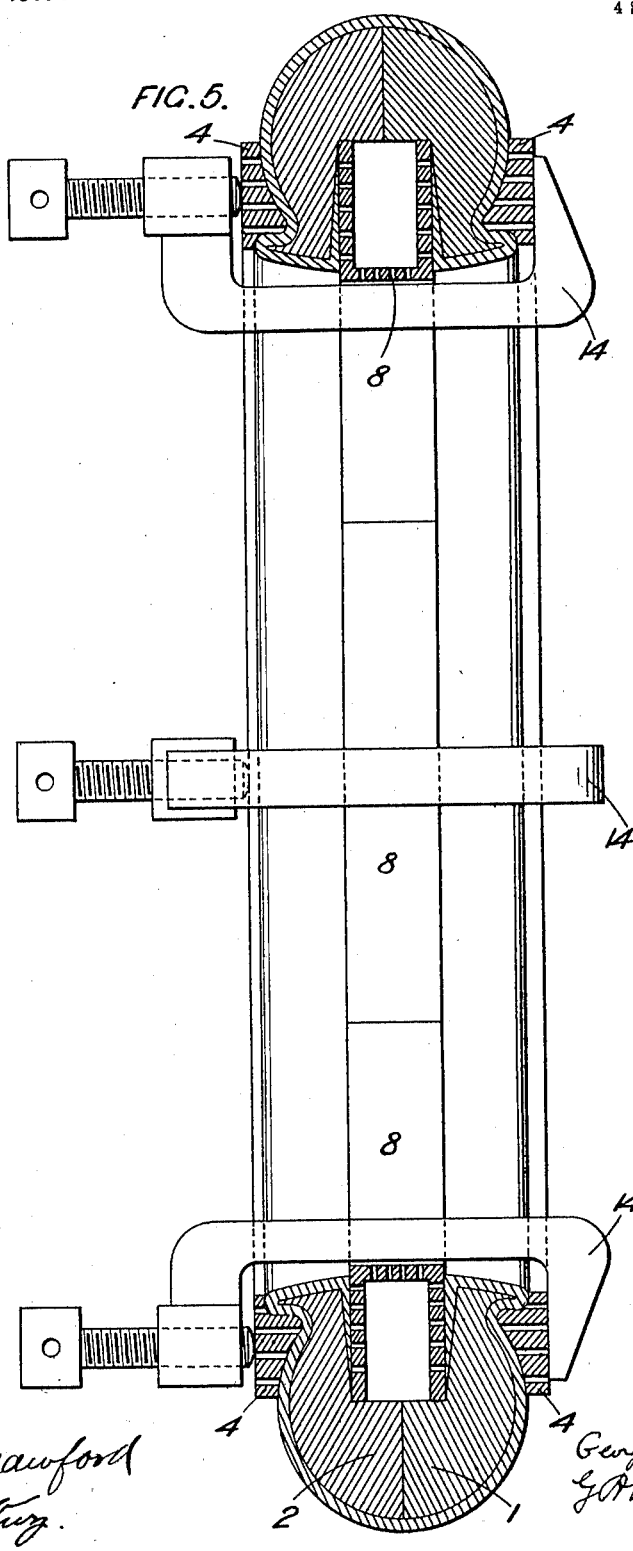

G. W. BELL.
DEVICE FOR SHAPING THE OUTER CASINGS OF PNEUMATIC TIRES.
APPLICATION FILED JULY 25, 1912.

1,061,722.

Patented May 13, 1913.
4 SHEETS—SHEET 4.

UNITED STATES PATENT OFFICE.

GEORGE WILSON BELL, OF STOCKPORT, ENGLAND.

DEVICE FOR SHAPING THE OUTER CASINGS OF PNEUMATIC TIRES.

1,061,722.  Specification of Letters Patent.  Patented May 13, 1913.

Application filed July 25, 1912. Serial No. 711,382.

*To all whom it may concern:*

Be it known that I, GEORGE WILSON BELL, a subject of the King of Great Britain, and resident of Stockport, in the county of Chester, England, have invented certain new and useful Improvements in Devices for Shaping the Outer Casings of Pneumatic Tires, of which the following is a specification.
The present invention is particularly an improvement upon the subject-matter of my earlier applications for Letters Patent of the United States, filed February 10, 1911, Serial No. 607,811 and filed May 16, 1911, Serial Nos. 627,432 and 627,433, the object of the present invention being to materially simplify the devices described and illustrated in said earlier applications.

The invention will be particularly described in connection with the accompanying drawings which illustrate one embodiment thereof and in which:—

Figure 1:
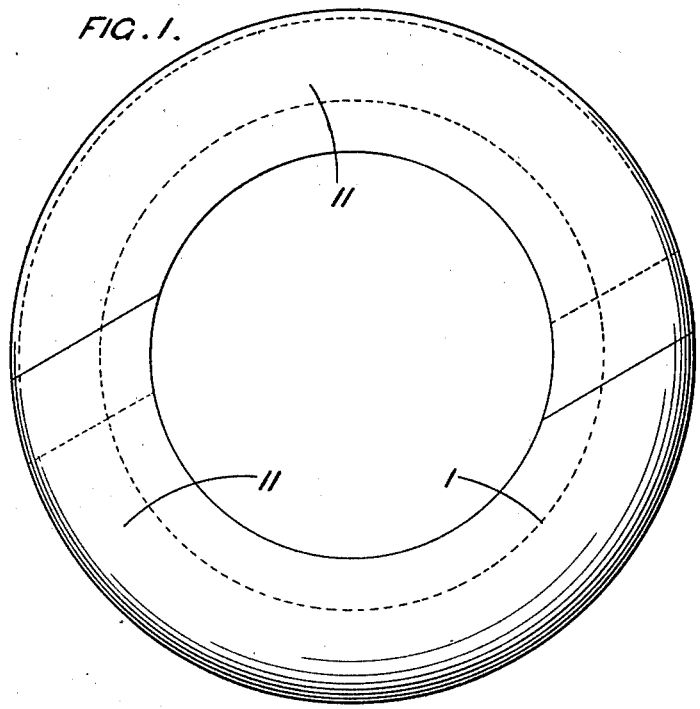
Figure 2:
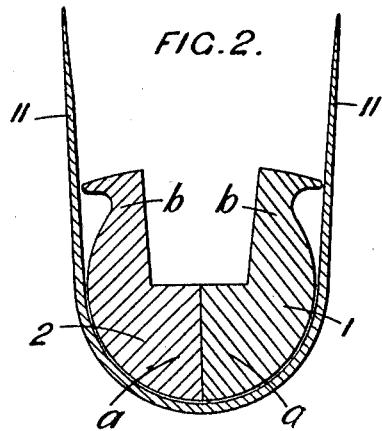
Figure 6:
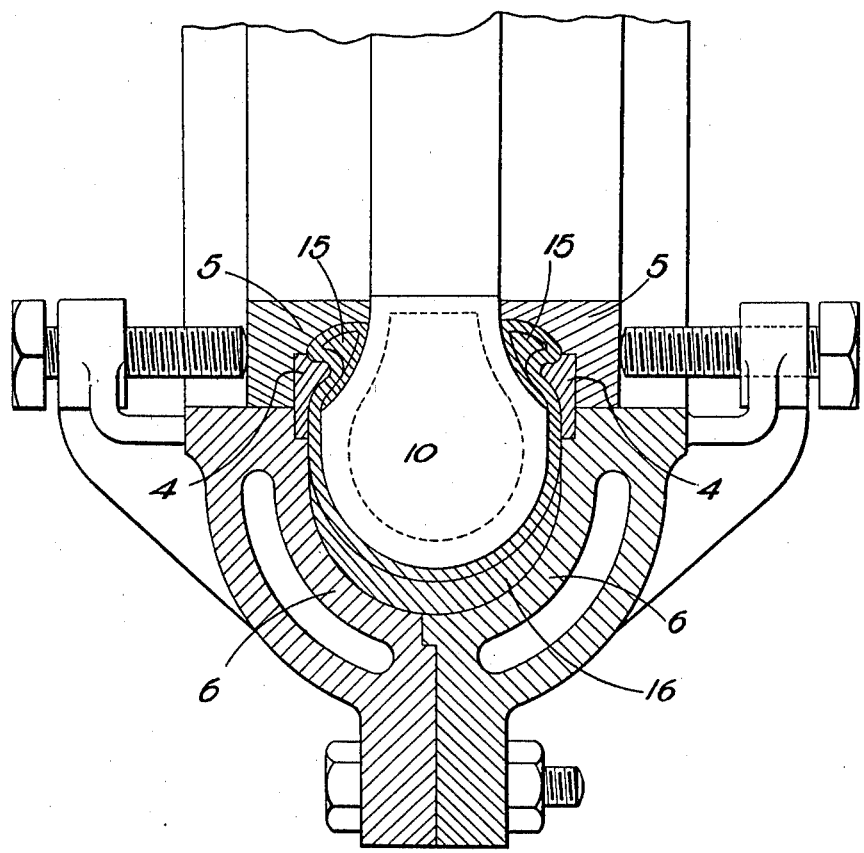

Figure 1 is a plan view of the internal die or core having two strips of leather fitted thereon with their ends overlapping and their longitudinal edges projecting radially inward; Fig. 2 is a cross sectional view of the parts shown in Fig. 1. Fig. 3 is a cross sectional view showing the core and casing material thereon in place in the pressing means or mold, one of the laterally movable dies of said pressing means being removed; Fig. 4 is a cross sectional view with all of the parts of the pressing or molding means in position; Fig. 5 is a diametrical sectional view of the internal core with the external recess-forming dies clamped thereto and withdrawn from the mold so as to permit the casing to dry. Fig. 6 is a sectional view showing the arrangement of parts for finishing the casing.

Referring to the drawings it will be seen that the internal core or die about which the tire casing is initially shaped comprises two similar annular die-pieces 1, 2, which are suitably engaged one with the other, as by means of pins (not shown) so that they will be maintained in proper relative position. The inner face of each of said core sections is recessed so that when the two parts are assembled an annular groove is formed in the inner face of the core and the outer surfaces of the reduced sections $b$ of the core members are recessed or grooved as shown to receive the bead-forming mem- bers of the pressing means hereinafter referred to.

In the embodiment of the invention illustrated the pressing means by which the casing-forming material 11 is properly shaped upon the annular core comprises bead-forming dies or sections 4, which are removably supported in suitable seats or recesses in the inner faces of mold-like sections 6, a filling piece 16$^a$ arranged within the sections 6 and corresponding to the tread member which is subsequently applied to the tire casing, and dies 5 mounted on said members 6 and adjustable transversely of the annular core to force the sections of the casing material 11 which project beyond the inner face of the core over said inner surface and into position to enter the annular groove formed in the core. Said means it will be noted are adapted to receive the core and casing material fitted thereon and press said material closely about the core. A series of radially movable dies 8 are provided to force the sections 13 of the casing material into the annular groove in the core.

The several steps in the formation of a tire casing with the devices illustrated are clearly shown in the sectional views 2 to 4. As shown the casing is assumed to be formed of two strips of leather 11 which entirely surround the internal annular core and project radially inward therefrom as shown in Figs. 1 and 2. The overlapping ends of these strips are chamfered and temporarily connected by sewing to form an endless band which, as will be understood, is tightly stretched about the core. The pressing means is then applied to the core and leather strips thereon. As shown the two members 6 of the pressing means are detachably connected by a bolt 12 so that they may be disconnected and separately applied to the core by tightening the nuts on said bolts 12, or by other suitable means.
The two sections of the pressing means are moved toward the core so that the dies 4 thereof will force the leather into the external recesses in the reduced sections $b$ of the core members and the portion of the leather strips intermediate of such inwardly deflected sections into close contact with the main body portions $a$ of said core. During the steps described the edge portions 13 of the leather strips may be suitably clamped. Thereafter said edges are disconnected and the dies 5 adjusted to move the radially projecting portions of the leather strips transversely of the core and over the annular groove in the inner face thereof and thereafter the radially movable dies 8 are forced into said groove to press the edge portions of the leather strips therein, at which time the parts occupy the positions shown in Fig. 4. If the material operated upon is wet leather the core, casing thereon and the dies 4 and 8 are detached from the other members of the shaping means and, after the dies 4 have been suitably connected as by clamps 14, placed in a drying chamber, preferably under vacuum. To assist the drying of the casing the dies 4 and 8 are preferably perforated as shown and also the clamps 14 may be temporarily released from time to time. If the material treated is rubbered leather, although it is preferable to treat it in the manner just described, the casing may be dried without removing it and the core about which it extends from the mold. When the casing has dried it is removed from the core after cutting the stitches connecting the sections thereof together, and after suitable cores 15 have been properly inserted and the ends and edges of the strips properly cemented a finishing die 10 is positioned therein and pressure applied by suitable means similar to those previously described. At the same time a tread portion 16, may be properly cemented to the curved surface of the casing as shown in Fig. 6.

Having thus described the invention what is claimed as new and desired to be secured by Letters Patent is:

1. A device for shaping the outer casing of pneumatic tires comprising in combination an internal annular core having an annular groove in its inner face into which the bead-forming edges of the casing material may be inserted, sectional means adapted to receive the core and casing material fitted thereon and press said material closely about the core, and a plurality of radially movable dies adapted to fit into the annular groove in the core and clamp the bead-forming edges of the tire casing therein.

2. A device for shaping the outer casings of pneumatic tires comprising in combination an internal annular core having an annular groove in its inner face into which the bead-forming edges of the casing material may be inserted, sectional means adapted to receive the core and casing material fitted thereon and press said material closely about the core, and a plurality of hollow, perforated, radially movable dies adapted to fit into the annular groove in the core and clamp the bead-forming edges of the tire casing therein.

3. A device for shaping the outer casings of pneumatic tires comprising in combination an internal annular core having an annular groove in its inner face into which the bead-forming edges of the casing material may be inserted, a sectional means adapted to receive the core and casing material fitted thereon and press said material closely about the core, said means including removable bead-forming sections, and a plurality of radially movable dies adapted to fit into the annular groove in the core and clamp the bead-forming edges of the tire casing therein.

4. A device for shaping the outer casing of pneumatic tires comprising in combination an internal annular core having an annular groove in its inner face into which the bead-forming edges of the casing material may be inserted, a sectional pressing means adapted to receive the core and casing material fitted thereon and press said material closely about the core, said pressing means having removable perforated bead-forming sections, and a plurality of radially movable dies adapted to fit into the annular groove in the core and clamp the bead-forming edges of the tire casing therein.

5. A device for shaping the outer casing of pneumatic tires comprising in combination an annular core, and pressing means adapted to receive the core and casing material fitted thereon and press said material closely about the core, said means including recessed body members 6, removable bead-forming sections fitted to the recesses in said members, and laterally movable dies mounted on said members and adapted to be projected transversely of the core.

Signed at Stockport this twelfth day of July, 1912.

GEORGE WILSON BELL.

Witnesses:
FREDERICK WILLIAM WILLIAMSON,
THOMAS M. WALMSLEY.